United States Patent
McCormick et al.

(10) Patent No.: US 7,429,010 B2
(45) Date of Patent: Sep. 30, 2008

(54) METHODS AND APPARATUS TO MECHANICALLY REDUCE FOOD PRODUCTS INTO IRREGULAR SHAPES AND SIZES

(76) Inventors: Michael S. McCormick, 1425 W. Gregory St., Unit 2, Chicago, IL (US) 60640; Donald Atkinson, 2135 W. 7070 Rd., North Judson, IN (US) 46366; Russell Butalla, 108 Heindl La., Marathon, WI (US); Carl Yessa, 814 Charles St., Edgar, WI (US)

( * ) Notice: Subject to any disclaimer, the term of this patent is extended or adjusted under 35 U.S.C. 154(b) by 266 days.

(21) Appl. No.: 11/130,813

(22) Filed: May 16, 2005

(65) Prior Publication Data

US 2006/0266175 A1   Nov. 30, 2006

(51) Int. Cl.
  *B02C 19/00* (2006.01)
(52) U.S. Cl. ............................................. 241/3; 241/29
(58) Field of Classification Search .................... 241/91, 241/101.4, 3, 260.1, 29, 152.2, 160; 83/651.1, 83/408, 44, 45, 46, 47; 366/322
See application file for complete search history.

(56) References Cited

U.S. PATENT DOCUMENTS

| | | | |
|---|---|---|---|
| 3,505,085 A * | 4/1970 | Stephenson et al. ......... | 425/208 |
| 3,980,235 A | 9/1976 | Kuhlman | |
| 4,599,928 A | 7/1986 | Oker | |
| 4,646,602 A * | 3/1987 | Bleick ........................ | 83/408 |
| 5,425,307 A | 6/1995 | Rush et al. | |
| 5,932,159 A * | 8/1999 | Rauwendaal ........... | 264/211.21 |
| 6,314,849 B1 | 11/2001 | Arrasmith | |
| 6,403,138 B1 * | 6/2002 | Arora ........................ | 426/516 |
| 6,549,823 B1 * | 4/2003 | Hicks et al. ................. | 700/159 |
| 6,561,067 B2 | 5/2003 | Arrasmith | |
| 6,575,725 B1 | 6/2003 | Keel | |
| 6,652,899 B1 | 11/2003 | Keel | |

OTHER PUBLICATIONS

Urschel Laboratories Incorporated, Oct. 2, 1830 (s.s. 1713). *How to Cut Dairy Food Products*. Retrieved Jun. 3, 2005 from http://www.urschel.com.

Urschel Laboratories Incorporated, Model RA-D literature, Retrieved Jun. 3, 2005 from http://www.urschel.com/machines.php?mid=37.

* cited by examiner

*Primary Examiner*—Mark Rosenbaum
(74) *Attorney, Agent, or Firm*—Fitch, Even, Tabin & Flannery

(57) ABSTRACT

Apparatus and methods of using the apparatus for manufacturing irregularly shaped and sized products, and in particular cheese irregularly shaped and sized crumbles from cheeses, such as semi-soft cheeses including types of cheddar, mozzarella, Monterey jack, Colby, pepper jack, provolone, Swiss, Mexican cheeses and any other combinations of two or more varieties. The apparatus preferably includes five knife assemblies that combine to reduce bulk cheese products into irregularly shaped and sized cheese crumbles in a high-speed commercial manufacturing process. In addition, the apparatus includes one or more augers having flights configured for working or reshaping peripheral edges of the cheese during the manufacturing process.

17 Claims, 6 Drawing Sheets

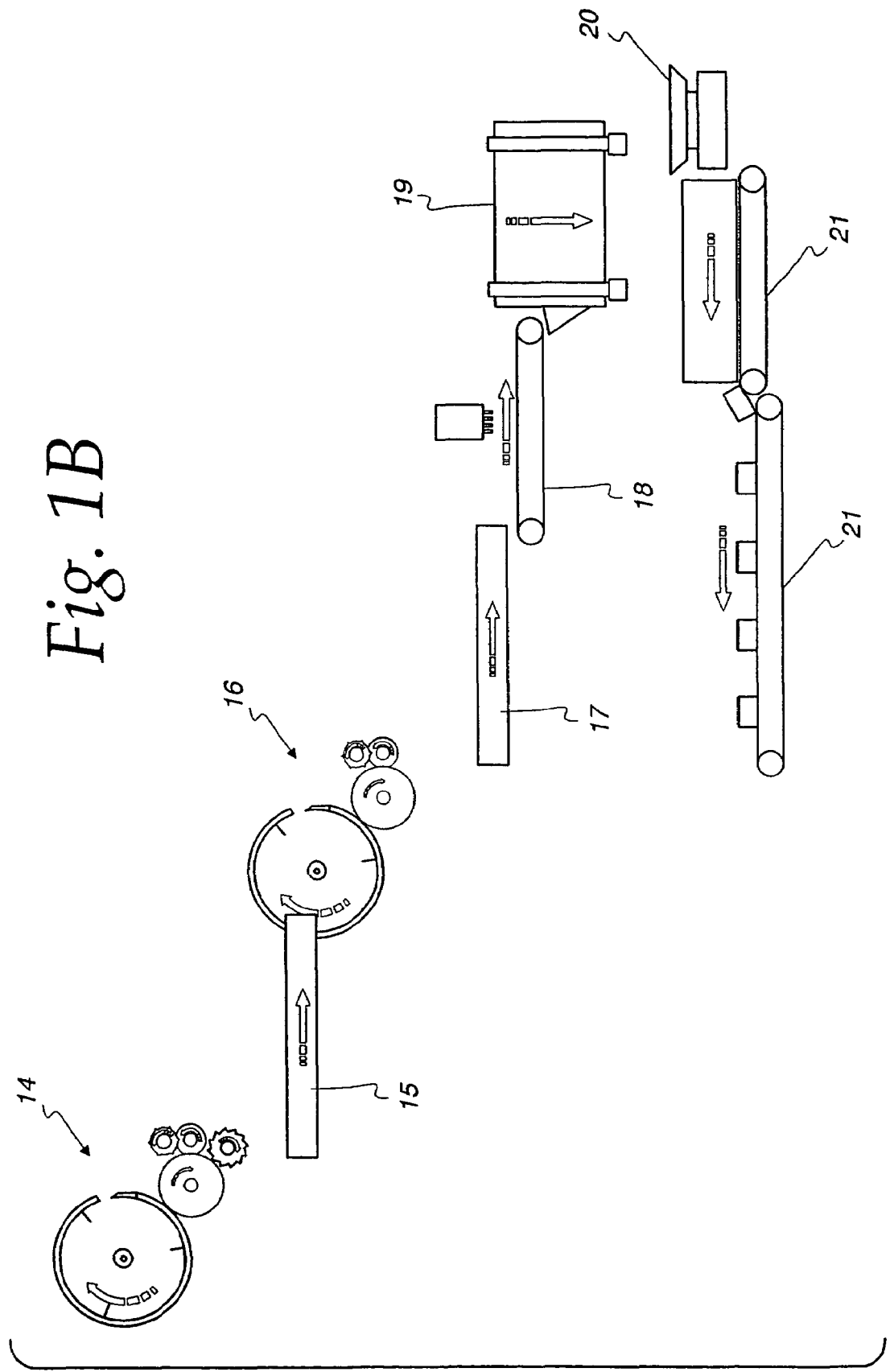

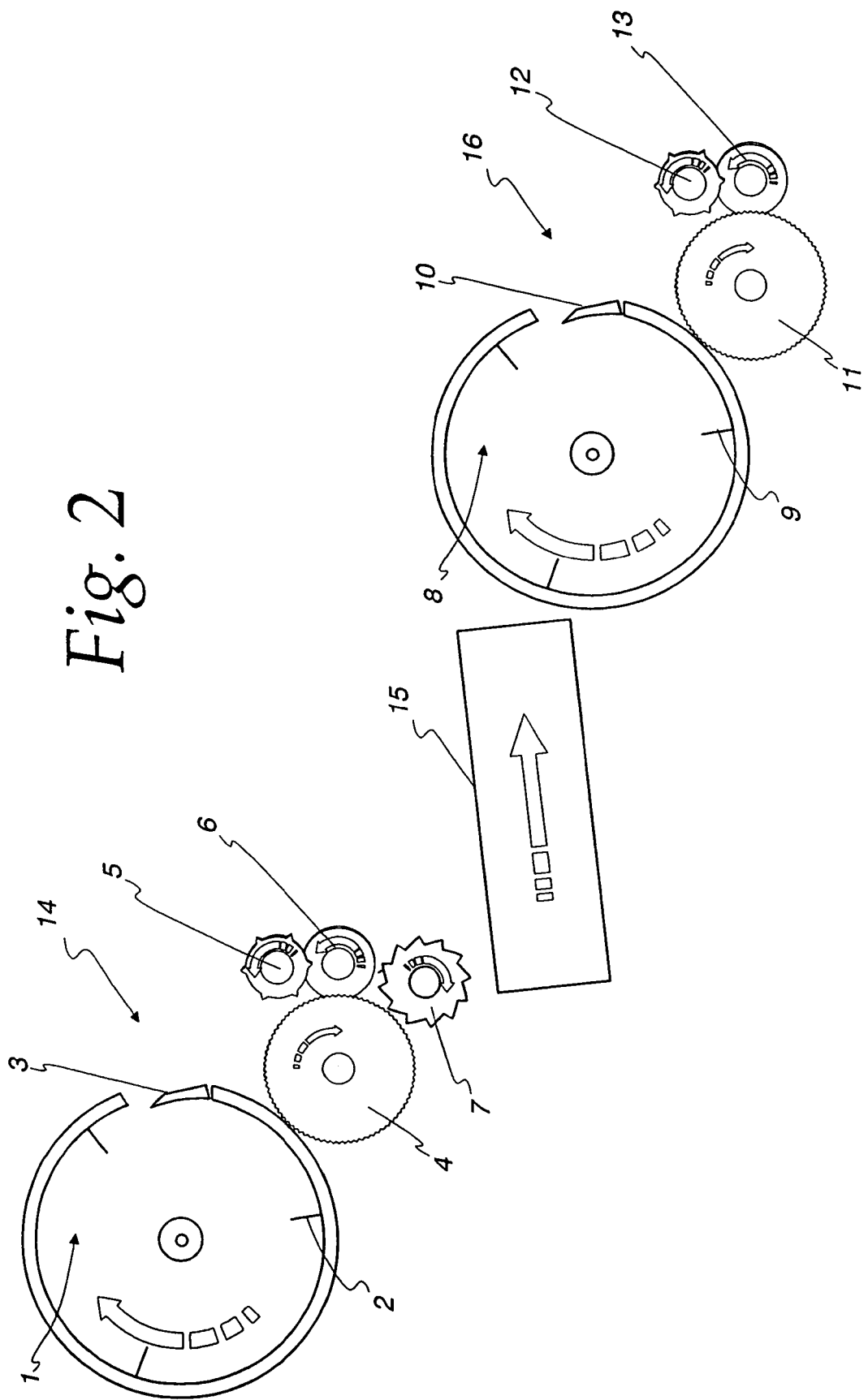

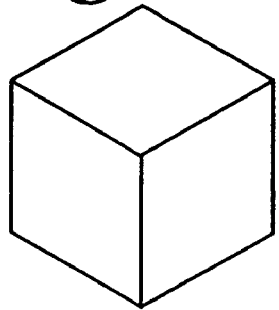
*Fig. 5A*
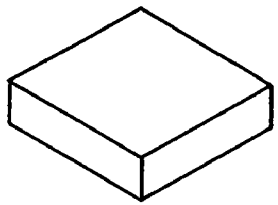
*Fig. 5B*
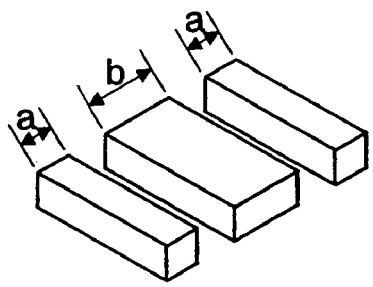
*Fig. 5C*
*Fig. 5D*
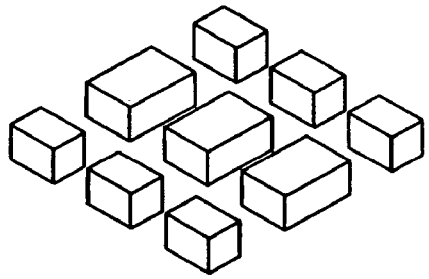
*Fig. 5E*
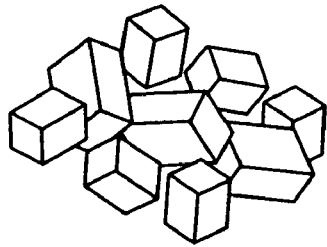
*Fig. 5F*
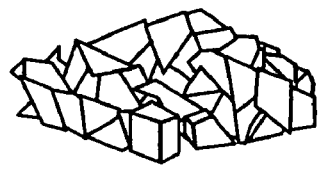
*Fig. 5G*
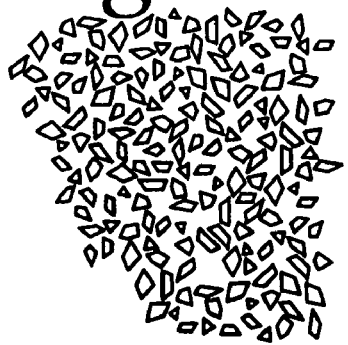

METHODS AND APPARATUS TO MECHANICALLY REDUCE FOOD PRODUCTS INTO IRREGULAR SHAPES AND SIZES

FIELD

This disclosure relates generally to methods and apparatus for producing irregularly shaped and sized food pieces, more particularly irregularly shaped and sized cheese crumbles.

BACKGROUND

Cutting or slicing systems are often used for producing uniform and/or predetermined shapes and sizes of cheese. Bulk cheese produces can be cut into evenly sized cubes or shreds suitable for consumer use. An apparatus for cutting cheese into cubes can utilize small spaced wires to cut through larger blocks of cheese or knives to cut slices into cube shapes of generally predetermined sizes and shapes. Cheese shredders can utilize a grating device into which cubes or blocks of cheese are placed and subsequently grated into numerous strips or shreds of generally predetermined sizes and shapes.

Irregularly shaped and sized cheese pieces, or crumbles, can be used with various types of foods, such as in cooking or as a topping. Certain types of cheeses naturally tend to crumble with a small degree of working. These types of naturally crumbly cheeses, such as feta and blue cheeses, are often have a higher acid and salt content that makes them softer. To produce cheese crumbles from a block or cube of soft cheeses having higher acid and salt content, the cheese is passed through a cutting machine with two blades assemblies. The primary blade assembly can have a single blade for cutting the cheese in a transverse machine feed direction and the secondary blade assembly can have a plurality of blades for cutting the cheese in a parallel machine feed direction. Due to the malleable texture of the soft cheeses having higher acid and salt content, further processing can be unnecessary, and the cheese tends to naturally crumble or fall apart into small, irregularly shaped and sized cheese crumbles following cutting by the two blade assemblies.

The typical cheese cutting apparatus having two knife assemblies does not produce suitable cheese crumbles from cheeses having harder consistencies, such as semi-soft cheeses, because of the lower acid and salt content of the cheese which can make such cheese more firm and prevent natural crumbling.

SUMMARY

Methods and apparatus are disclosed for manufacturing irregularly shaped and sized food product crumbles, along with food product crumbles made according to the methods and with the apparatus described herein. The food product may comprise cheeses, such as semi-soft or natural cheese including types of cheddar, mozzarella, Monterey jack, Colby, pepper jack, provolone, Swiss, Mexican cheeses, low fat versions of such cheeses, and any other combinations of two or more varieties. The apparatus preferably includes five knife assemblies that combine to reduce bulk food products, such as bulk cheese products, into irregularly shaped and sized food product crumbles in a high-speed commercial manufacturing process. In addition, the apparatus includes one or more augers having flights configured for working or reshaping peripheral edges of the food product during the manufacturing process.

A cutting apparatus is provided for use in a high speed commercial manufacturing operation for producing a regular shaped food product crumbles, such as cheese crumbles. The apparatus includes a first, second, third, fourth and fifth knife assembly. The first knife assembly has at least one knife blade positioned at generally transverse to the feed direction to cut a slice from a bulk food product. The second knife assembly has a plurality of knife blade positioned generally parallel to the feed direction to cut a plurality of strips from the slice. The third knife assembly has a least one knife blade positioned generally perpendicular to the feed direction to cut a plurality of food product portions from the plurality of strips. A fourth knife assembly is provided having at least one knife blade positioned generally transverse to the feed direction to cut a plurality of a regular food product pieces from the plurality of food product portions. The fifth knife assembly has a plurality of knife blade positioned generally parallel to the feed direction to cut a plurality of a regular shaped food product crumbles from the plurality of a regular food product pieces.

At least one of the first, third and fourth knife assemblies includes at least one knife blade oriented in a generally transverse direction to the feed direction of the food product cutting apparatus. At least one of the second and fifth knife assemblies comprises at least one knife blade oriented in a generally parallel direction to the feed direction of the food product cutting apparatus. Preferably, though not necessarily, each of the first, third and fourth knife assemblies comprises at least one knife blade oriented in a generally transverse direction to the feed direction of the food product cutting apparatus. Preferably, though not necessarily, each of the second and fifth knife assemblies comprises a plurality of knife blades, such as circular blades oriented in a generally parallel direction to the feed direction of the food product cutting apparatus.

At least one of the second and fifth knife assemblies may comprise a plurality of knife blades mounted to a shaft for rotation therewith. The spacing between a first pair of adjacent knife blades may be different than the spacing between a second pair of knife blades on either the second or fifth knife assembly. The difference is spacing between the knife blades of the second knife assembly may result in strips having different widths. Similarly, the difference in spacing between the knife blades of the fifth knife assembly may result in food product crumbles having different widths. The third knife assembly may comprise a plurality of knife blades mounted to a shaft for rotation therewith.

A method is providing for producing irregular shaped food product crumbles using a food product cutting apparatus. The method includes cutting a slice of bulk food product using a first knife assembly. The method also includes cutting a plurality of strips from the slice using a second knife assembly. The method further includes cutting a plurality of food product portions, which may be generally rectangular, from the plurality of strips using a third knife assembly. The method also includes cutting a plurality of a regular food product pieces from the plurality of food product portions using a fourth knife assembly. A fourth knife assembly is disposed after the first, second and third knife assemblies. The method also includes cutting a plurality of a regular shaped food product crumbles from the plurality of a regular food product pieces using a fifth knife assembly.

The method may include cutting the food product during the manufacturing process using knife assemblies having the configurations described above with respect to the apparatus for use in producing irregular shaped food product crumbles.

The method of producing a regular shaped food product crumbles may further include the steps of feeding the slice in a feed direction to the second knife assembly in a generally planar orientation, feeding the strips in the feed direction to the third knife assembly in a generally planar orientation, and feeding the generally rectangular food product portions in the feed direction to the fourth knife assembly in a generally non-planar orientation.

The method of producing a regular shaped food product crumbles may include the steps of transporting the generally rectangular food product portions between the third and fourth knife assemblies using an auger having off-set flights. During the transporting of the generally rectangular food product portions using the auger, the edges of the generally rectangular food product portions may be worked using edges of the off-set flights.

Further manufacturing processes may be performed on the food product crumbles produced using the apparatus and methods described herein. For example, the irregular shaped food product crumbles may be placed in a tumble drum and an anti-cake agent may be added to the food product crumbles in the tumble drum. In another example, the food product crumbles may be weighed using a weighing mechanism. The weighing mechanism may dispense a predetermined weight of irregular shaped food product crumbles into a flexible package.

In another aspect, a method and apparatus of working peripheral edges of cut food product pieces to reshape the food product pieces, such as cheese, is provided. The method includes advancing food product through an auger using a plurality of flights of the auger. The method also includes working the edges of the cut food product pieces using edges of the flights. The edges of the flights are formed between adjacent flights off-set by a predetermined amount. In one instance, the auger may comprise a plurality of flights that are off-set from each other by about 90°.

DETAILED DESCRIPTION OF THE DRAWINGS

FIG. 1B is a flow diagram of an apparatus for producing irregularly sized and shaped cheese crumbles;

FIG. 2 is a diagrammatic side elevation view of an apparatus for producing irregularly sized and shaped cheese crumbles;

FIGS. 5A-5G are idealized perspective views of cheese before and after cutting by the apparatus of FIG. 2.

DETAILED DESCRIPTION

Methods and apparatus are disclosed herein and illustrated in FIGS. 1-6 for manufacturing irregularly shaped and sized products, and in particular cheese irregularly shaped and sized crumbles from cheeses, such as semi-soft cheeses including types of cheddar, mozzarella, Monterey jack, Colby, pepper jack, provolone, Swiss, Mexican cheeses and any other combinations of two or more varieties. In addition, food products, such as cheese, manufacturing using the methods and apparatus described herein. The apparatus preferably includes five knife assemblies that combine to reduce bulk cheese products into irregularly shaped and sized cheese crumbles in a high-speed commercial manufacturing process. In addition, the apparatus includes one or more augers having flights configured for working or reshaping peripheral edges of the cheese during the manufacturing process.

Figure 1A:
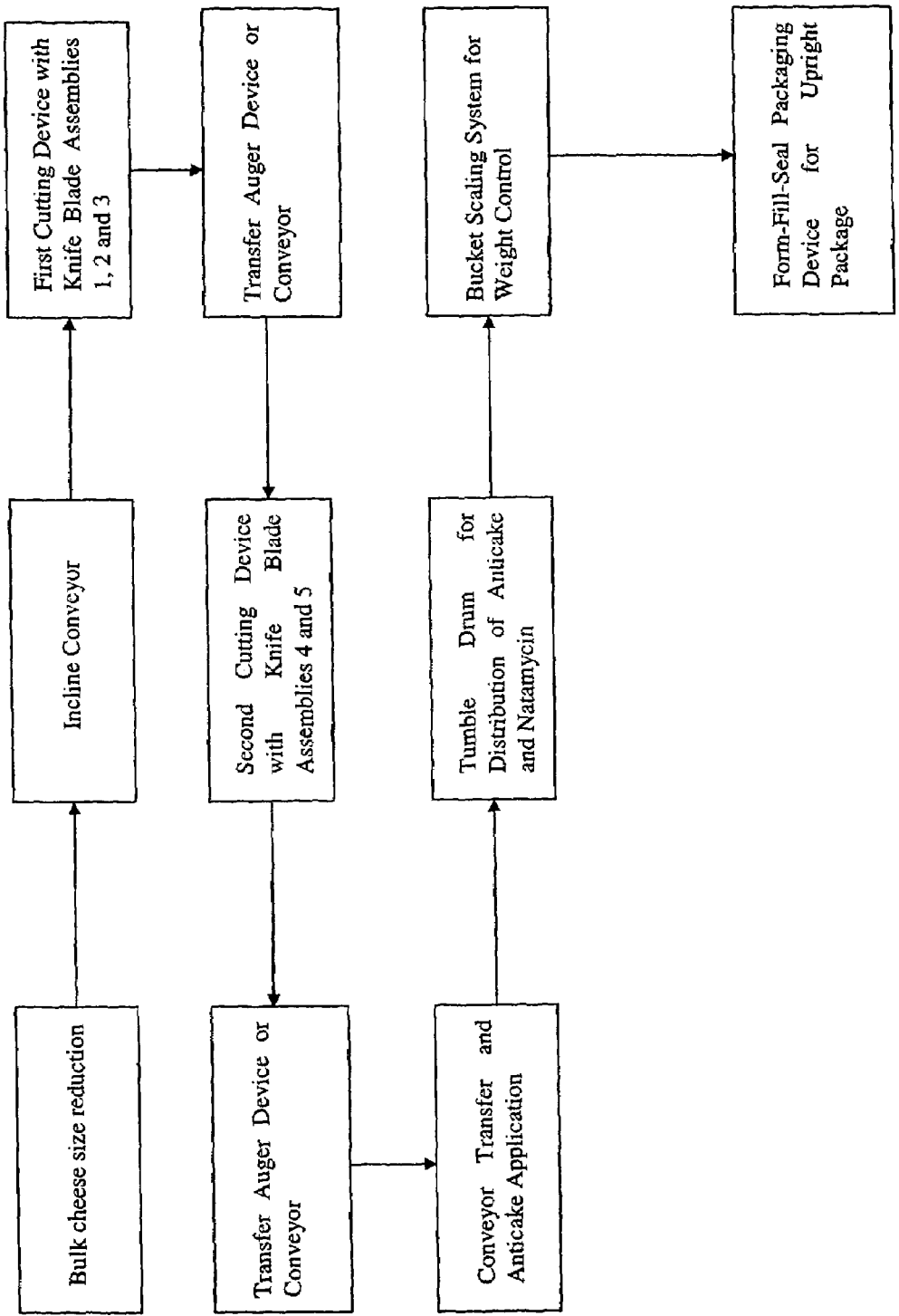
FIG. 1A is a flow chart of a method for producing irregularly sized and shaped cheese crumbles.

Bulk cheese blocks are first reduced into smaller, generally cube-shaped cheese portions, as shown in the flow chart in FIG. 1A, using typical bulk cheese reduction equipment. The cube-shaped cheese portions are preferably at least about 3"×3"×3" or less, and more preferably are reduced to at least about 2"×2"×2". The cheese varieties used may be cheddar cheeses (sharp, medium, mild), mozzarella, Monterey jack, reduced fat Monterey jack, reduced fat cheddar, Colby, reduced fat Colby, pepper jack, Mexican cheeses, provolone, Swiss, and any other natural or semi-soft cheese that has a lower acid and salt content such that its consistency is solid and firm and does not readily crumble, as compared to typical soft cheeses having higher acid and salt content, such as feta and blue cheeses.

The cheese cubes are transferred to an incline conveyor which transports the cheese to the cutting system in a process feed direction or downstream direction, where this direction is in the general direction of movement of the cheese through the cutting system at a particular point in the process. The cutting system consists of five knife assemblies used in series. The conveyor first transports the cheese cubes to the first cutting device or cutting machine, which consists of the first three knife assemblies. The first cutting machine preferably produces cheese into preferably, though not necessarily, generally rectangular portions. A second conveying device, such as a conveyor, including a bucket conveyer, or an auger, as will be described in greater detail herein, transfers the cheese from the first cutting device to a second cutting device having the fourth and fifth knife assemblies. The second cutting device produces cheese in a crumbled form. A preferred type of cutting device is an Urschel Model RA-D, manufactured by Urschel Laboratories, Inc., Valparaiso, Ind., U.S.A., which may be modified in accordance with the present disclosure.

Further processing of the cheese may include conveying with an auger, transferring the cheese to a tumble drum to apply an anti-cake agent and an antimicrobial agent, such as Natamycin. The resulting cheese crumbles may be weighed in small bulks with the various bulks combining to provide for predetermined quantity weights or weight ranges for packaging into individual packages for retail sale. The packages are preferably of the type disclosed in the U.S. patent application entitled "FLEXIBLE PACKAGES" and filed on May 3, 2005, the disclosure of which is hereby incorporated by reference in its entirety. The packages may be made using the methods and apparatus disclosed, for example, in U.S. Pat. Nos. 6,357,914; 6,688,079 and 6,688,080, the disclosures of which are hereby incorporated by reference in their entirety.

Turning now to the details of the food product cutting devices, the cheese cubes are fed into a hopper on the top of the cutting device and fall into a centrifugal drum 1 which contains numerous impellers 2 attached around the interior circumference of the drum 1. The cheese cubes are generally held in place by these impellers 2 and by centrifugal force as the centrifugal drum 1 rotates. During rotation of the drum 1, the cheese cube is urged against a first knife assembly 3 comprising a knife blade orientated generally transverse to the feed direction of the apparatus, i.e., not precisely parallel, to cut a slice of cheese from the cheese cube. Each revolution of the drum 1 generally results in the first knife assembly 3 cutting a slice for the cheese cubes. The slice thickness may vary between approximately 1/16 inches. and ½ inches, and preferably from between about 5/16 inches to ½ inches. The thickness of the slice can be varied by changing the gap between the slicing knife 3 and the centrifugal drum 1 or by adjusting the angle of the slicing knife 3.

The cheese slice then falls between a feed spindle 5 and the feed drum 4, each of which is adapted for rotation above an axis generally transverse to the feed direction of the apparatus. As the feed drum 4 and the feed spindle 5 rotate they combine to advance the slice through the cutting process via the nip or spacing between the feed drum 4 and the feed spindle 5 and into contact with a second knife assembly 6. The second knife assembly 6 comprises a plurality of circular knife blades 22 mounted on a rotatable shaft 25 and are positioned in a direction that is generally parallel, i.e., not perpendicular, to the process feed direction. The circular knife 6 cuts the cheese slices into strips. The circular knife blades 22 are spaced to fit into grooves located on the feed drum 4 to minimize interference between the blades 22 and the feed drum 4.

The feed drum 4 and/or feed spindle 5 may contain feed protrusions or spikes on their circumference to assist in advancing the cheese. The feed protrusions of the spindle fit into gaps between the circular knives 6 and in the grooves on the feed drum 4 to minimize interference.

Figure 3:
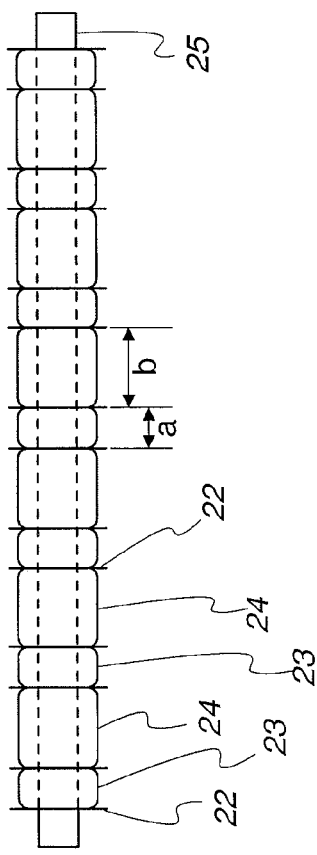
FIG. 3 is a perspective view of a circular knife assembly for use in the apparatus of FIG. 2.

The second knife assembly 6 has a plurality of blades 22 that are unevenly spaced apart for cutting the cheese slice into strips of varying widths. The second knife assembly 6 may consist of between one and fourteen blades 22, and preferably fourteen blades 22, depending upon the number of strips desired. The fourteen blades in the circular knives 6 having different spacings therebetween to cut the slices into strips having varying widths. As illustrated in FIG. 3, the first spacer 23 creates a gap or space of length 'a,' and a second spacer 24 creates a gap of length 'b.' The spacers 23, 24 can be alternated every other one, such that the spacing between blades 22 is also alternating between a space of length 'a' and 'b.' The blade spacing may be varied from ⅛ inches to 1 inch, and more preferably from ⅜ inches to ½ inches. Preferably not all fourteen blades will be at the same spacing. For example, seven blades may be spaced at ⅜ inches, or designated by a spacer 23 with a distance of 'a' between blades 22, with the remaining six blades at ½ inches apart, or designated by spacers 24 with a distance of 'b' between blades 22. Alternately, seven blades spaced at ½ inches and six blades spaced at ⅜ inches, or any other combination, may be used. Preferably, though not necessarily, the cheese strips will thus vary in width from either ⅜ inches or ½ inches depending on the spacing that was set between the circular knife blades 22.

Once the cheese slice is cut into multiple strips, the strips are then sent to the third knife assembly 7. The third knife assembly includes one or more crosscut knife blades mounted on a rotatable shaft. The blades may contain small teeth or sharp points along their periphery. The blades of the crosscut knife 7 may be configured to fit into the grooves on the feed drum 4. The crosscut knife 7 may have a plurality of blades that are equidistantly spaced apart and contain anywhere from one to five knives on it. There are preferably four or five knife blades and the spacing or distance between the knives is equidistant and may vary between ⅛ inches to 1½ inches. For example, if four knives are used, the spacing between all four knives is set to ¾ inches and if five knives are used the spacing between them is set to ½ inches. Preferably, four knives are used with the spacing set at ¾ inches. The crosscut knife 7 cuts the cheese strips into smaller generally rectangular cheese portions that are of various sizes; some are cube-like in shape and others are more rectangular.

Figure 4:
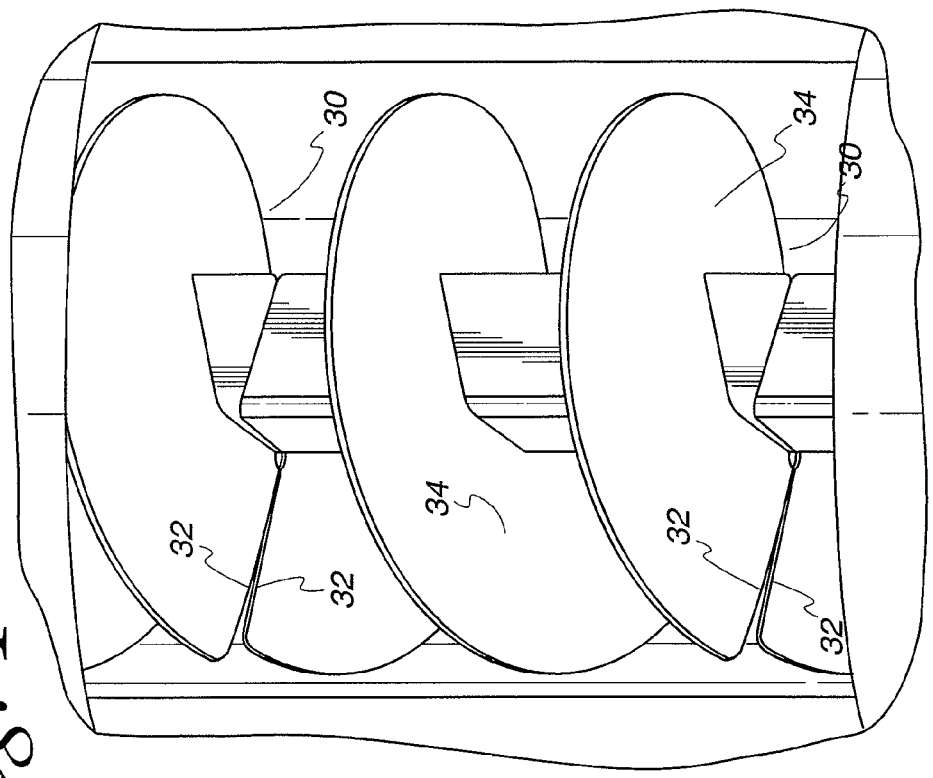
FIG. 4 is a view of an auger depicting only the screw conveyor portion with inverted flights.

Next, the apparatus includes a conveying mechanism 15 for transporting the cheese portions to the second cutting device. The conveying mechanism may comprise a conveyor. Preferably, however, the conveying mechanism comprises a screw auger having a plurality of flights 30 mounted to a square or round shaft. The flights may each extend, for example, about 360 or 720 degrees. One or more, and preferably all, of the flights are offset from adjacent flights, such as by about 90 degrees to expose a pair of edges 32 of the flights 30, as illustrated in FIG. 4. Thus, the flights are arranged such that the screw surfaces 34 for advancing the food product are non-continuous. The flights may be formed of a food grade plastic and housed in a metal, such as stainless steel, bin. During rotation of the auger, the flights 30 advance the cheese portions in the feed direction while the edges 32 of the auger flights 30, and the gaps therebetween, work the edges and/or peripheral sides of the cheese portions to soften or smooth out the cheese portions.

The flights are approximately ten inch sections of the screw conveyor that can be disassembled from one another and reassembled. When reassembled, these sections, or flights, are offset from each other by rotating the flight one-quarter turn in either direction along the shaft of the conveyor such that the flights are in slightly inverted positions. Every other flight section is offset by a one-quarter turn along the shaft, while the remaining flights are placed in a common direction along the shaft. The inverted flights create a resistance to flow because of the inverted positions cause the cheese portions to rub against each other and the surface of the auger bin, thereby causing the cheese portions to be softened or rounded off in appearance. The residence time of the cheese inside the auger is between about eight to about twenty seconds, more preferably approximately fifteen seconds or less. A top cover of the auger may be removable, with openings in the bottom and the top sections for feeding the cheese pieces into the auger and for pushing the pieces out of the auger, respectively. An example of an auger used may be seven feet long set at an inclined angle of twenty-two degrees and with a seven inch diameter screw.

As the cheese portions exit from the end of the auger, the cheese is transported directly into the feed hopper of the second cutting device. Optionally, the cheese may be transferred back onto the conveyor system and then proceed toward the second cutting device. The second cutting device is made up of two knife assemblies, the fourth and fifth knife assembles 10 and 13. The fourth knife assembly is similar to the first knife assembly and the fifth knife assembly is similar to the second knife assembly, as discussed in greater detail above.

The generally rectangular cheese portions from the first machine are fed into the hopper of the second machine and enter the centrifugal drum 8. From there the pieces encounter the slicing knife 10, which instead of slicing just a single piece of generally planar cheese as in the first cutting device, now may be cutting a plurality of pieces at once and in a plurality of different orientations, such that when the slices are made a number of different size slices will be cut at the same time. The second cutting machine creates more random and irregular slices that differ in size and shape than the first machine. After creating a plurality of irregular cheese pieces, the pieces are further cut by the circular knife 13. Instead of cutting one slice into strips, the fourth knife assembly 13 of the second cutting device cuts a plurality of pieces into more pieces that have different, irregular shaped and sized crumbles. Variations in the blade spacing of the second and fifth knife assembles can change the size of the resulting cheese crumbles.

After the second cutting device, the cheese pieces may be passed through a second auger in order to smooth out and shape the peripheral edges of the cut pieces, similar to the auger described above. However, it can be suitable to use only one of the augers depending upon the type of food product crumbles to be produced.

A dry powder dispenser or feeder adds an anticake agent to the cheese crumbles as they are being transferred along a conveyor. After the anticake is applied, the cheese crumbles are transferred into a tumble drum, which mixes the food products inside while minimizing the damage to the product. An example of a tumble drum used in the process is inclined at a 5 degree angle, is 68 inches long and has a residence time from about 12 seconds to about 24 seconds, more preferably about 17 seconds. Dry powder dispensers and liquid spray applicators may also be combined with the tumble drum for coating products inside of the drum with anticake agent and/or mold inhibitors. A liquid spray applicator can add a mold inhibitor to the tumble drum. Once the mold inhibitor has been introduced into the tumble drum then the drum begins to rotate in order to evenly distribute the anticake agent and the mold inhibitor. An example of a mold inhibitor is Natamycin. An example of an anticake agent is a solution made up of 69.99% potato starch, 20% cellulose powder, 10% calcium sulfate, and 0.01% sodium aluminum sulfate.

FIG. 1B illustrates an arrangement of equipment and shows the two cutting machines 14, 16 which are separated by either an auger or a conveyor 15. After the second cutting machine 16, there is another auger or conveyor 17. There is an option of using a single screw auger for both reference numerals 15 and 17, of using one auger and one conveyor system or of not having any augers and using only a conveyor system to transfer the cheese. If a conveyor system is utilized for reference numerals 15 and 17, then another conveyor system at numeral 18 may not be necessary. The cheese crumbles are transferred from the auger or conveyor 17 onto an inclined conveyor 18 (it is only used if the auger is used at reference numeral 17) where an anticake agent is applied. The crumbles are then fed into a tumble drum 19 where a mold inhibitor is also added. From the tumble drum 19 the crumbles are weighed at bucket scales 20 and packaged 21.

FIGS. 5A-5G show idealized diagrams of the different cheese sizes at various stages of the cutting process. In FIG. 5A, the cheese is initially fed into the first cutting machine in small cubes of cheese of at least 3"×3"×3" or less. After the cheese cube passes through the first knife, it is cut into a single slice, as shown at FIG. 5B. Then the slice is cut by the second knife which cuts the cheese into strips or rectangles of varying width, as shown in FIG. 5C, and designating the different widths by 'a' and 'b.' The width of the strips is equivalent to the spacing of the knives in FIG. 3. Therefore, a spacer of length 'a' will create a strip of width 'a,' and similarly a spacer of length 'b' creates a strip of width 'b.' As shown in FIG. 5D, the cheese strips have been cut by the third knife and the cuts of the knife create generally rectangular cheese portions. Then the cheese portions may pass through an auger or conveyor and exit as a random clump or bunch of cheese, as shown in FIG. 5E. The clumps of cheese then pass through the fourth knife and the clumps are sliced by the knife which yields multiple slices of irregular cheese pieces, as shown in FIG. 5F. Finally, the cheese pieces are cut by the fifth knife and result in irregular sized and shaped cheese crumbles, as in FIG. 5G.

Figure 6:
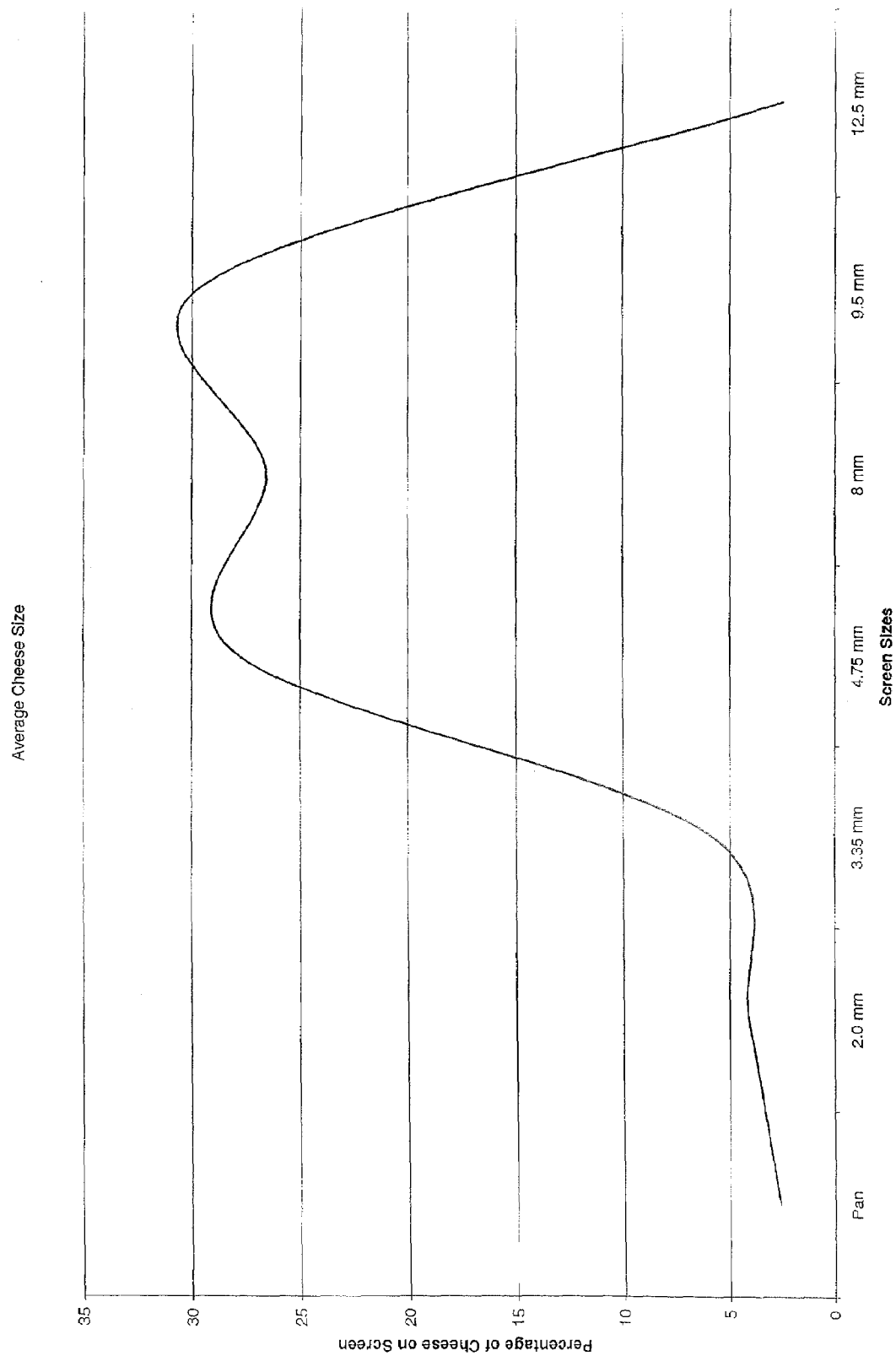
FIG. 6 is a chart showing cheese crumbles size distribution for cheese crumbles made using the apparatus and methods disclosed herein.

The final size of the irregular cheese crumbles preferably range in size from about 1/16 inches to about 1/2 inches, more particularly from about 3/16 inches to about 3/8 inches. As depicted in the graph of FIG. 6, about 75% of the cheese crumbles manufactured according to one test using the apparatus and methods described hereinabove were between 4.75×4.75 mm and 9.5 mm×9.5 mm.

EXAMPLES

The following examples illustrate presently preferred methods and should be understood to be illustrative of, but not limiting upon, the scope of the apparatus and methods which are set forth in the appended claims.

Example 1

Mozzarella cheese is precut into 2"×2"×2" cubes and is fed into a first Urschel RA-D cutting machine, manufactured by Urschel Laboratories, Inc., Valparaiso, Ind., U.S.A. All three cutting knives are utilized in the machine for the first pass of the cheese cubes through the machine. The slicing knife had a gap setting of 3/8 inches, the circular knives consisted of thirteen blades, seven set at a 3/8 inch gap and six set at a 1/2 inch gap. The final knife, the crosscut knife, consisted of four knives set at a 3/4 inch gap. The different size cheese strips are then placed on a conveyor and enter into the second Urschel RA-D cutting machine for the second pass of cutting. The second Urschel machine consists of only two knives, the slicing knife and the circular knife. The slicing knife and circular knives are set at the same settings as in the first Urschel machine. The cheese strips are cut into irregular pieces with different shapes and sizes as they pass through the second machine. After this second pass through a cutting machine the cheese pieces are sent into an auger with inverted flights and inclined at an angle of 25 degrees, which rounds out the edges of the cheese pieces. Upon exiting the auger the cheese pieces are placed onto a conveyor belt. While the cheese is being transported on the conveyor belt, an anticake blend made up of a 1.75% custom anticake solution is added to the cheese pieces. The cheese pieces are then placed into a tumble drum where natamycin is added at a concentration of 1.2% and the drum is rotated to mix everything together. After passing through the tumble drum the cheese pieces are weighed and packaged. The final product of cheese pieces are irregularly shaped and sized mozzarella cheese crumbles that have a more natural cut appearance.

Example 2

Mozzarella cheese is cut similarly to the steps in example 1, except that the slicing knife used is set at a gap of 5/16 inches, the remaining knives are as in example 1. The initial temperature of the cheese was at 38° F. When fed into both Urschel cutting machines. The cheese was fed into the first Urschel machine through a feed hopper and the cheese was fed into the second machine through the hopper at a feed rate of 4000 lb/hr. Anticake agent was added to the cheese pieces after exiting the second machine at an amount of 0.346 lbs of 1.75% custom anticake agent. The residence time in the tumble drum was 5 minutes. The results were similar to those in example 1, with irregularly shaped and sized mozzarella cheese being produced.

Example 3

Mild Cheddar cheese is precut into 2"×2"×2" cubes for a total amount of fifteen pounds of cheese. The same knife set up as in example 1 for mozzarella is used for the mild cheddar. The temperature of the cheese was about 38° F. The cheese was fed into the first Urschel machine through a feed hopper and the cheese was fed into the second machine through the hopper at a feed rate of 4000 lb/hr. Again the crosscut knife was removed from the second machine. Irregular sized and shaped mild cheddar cheese crumbles was produced.

Example 4

A three cheese mix was made comprising 50% Monterey jack cheese, 25% mild cheddar, and 25% Colby cheese, and with the cheese precut into 2"×2"×2" cubes. All three cheeses were blended into the Urschel RA-D machine to make a mixture of the three cheeses. The final total weight was 20 pounds; 10 pounds of Monterrey jack cheese and 5 pounds each of Colby and mild cheddar. The feed rate of the cheese was 4000 lb/hr. The knives were set up as in example 2. The samples were treated with 0.59 of 1.75% custom anticake agent prior to entering the tumble drum and the residence time in the tumble drum was 5 minutes. The final product was irregularly sized and shaped mixed cheese crumbles.

Example 5

A two cheese mix was made comprising half of 2% Monterey jack cheese and half of 2% Colby cheese, with the cheese being precut into 2"×2"×2" cubes. The two cheeses were blended into the Urschel machine to make a mixture of the two cheeses, with one cube of Monterey jack being fed for every one cube of Colby cheese. The knives were set up as in example 2. Temperature was kept at 38° F. The feed into the hopper for the second machine was 4000 lb/hr. After the cheese passed through the second machine, 0.63 lbs of a 1.75% custom anticake agent was added. The result was irregularly sized and shaped mixed cheese.

Example 6

Sharp cheddar cheese was precut into 2"×2"×2" cubes. The knives in both cutting machines were set up as in example 2. The temperature was maintained at about 38° F. The cubes were fed into the feed hopper of the first machine and then into the feed hopper of the second machine at a feed rate of 4000 lb/hr. After passing through the second machine, 0.31 lbs of 1.75% custom anticake agent was added to the cheese. Then the cheese was sent to a tumble drum where it had a residence time of about five minutes. The results were irregularly sized and shaped sharp cheddar cheese.

From the foregoing, it will be appreciated that apparatus and methods are described herein for manufacturing irregularly shaped and sized food products. While the figures and description herein are illustrative of certain aspects of methods and apparatus for manufacturing irregularly shaped and sized food products, the apparatus and methods are not limited to the aspects illustrated in the figures and described hereinabove. For example, while the description generally refers to cheese as the product being produced in irregular shapes and sizes, it is understood that a process according to the present description may be used other suitable products.

What is claimed is:

1. A method of producing irregular shaped cheese crumbles using a cheese cutting apparatus having a feed direction, the method comprising:
   cutting a slice from a bulk cheese product using a first knife assembly;
   cutting a plurality of strips from the slice using a second knife assembly;
   cutting a plurality of generally rectangular cheese portions from the plurality of strips using a third knife assembly;
   cutting a plurality of irregular cheese pieces from the plurality of cheese portions using a fourth knife assembly after the cutting with the first, second and third knives; and
   cutting a plurality of irregular shaped cheese crumbles from the plurality of irregular cheese pieces using a fifth knife assembly.

2. A method of producing irregular shaped cheese crumbles in accordance with claim 1, wherein at least one of the first, third and fourth knife assemblies comprises at least one knife blade orientated in a generally transverse direction to the feed direction of the cheese cutting apparatus.

3. A method of producing irregular shaped cheese crumbles in accordance with claim 2, wherein at least one of the second and fifth knife assemblies comprises at least one knife blade orientated in a generally parallel direction to the feed direction of the cheese cutting apparatus.

4. A method of producing irregular shaped cheese crumbles in accordance with claim 3, wherein each of the first, third and fourth knife assemblies comprises at least one knife blade orientated in a generally transverse direction to the feed direction of the cheese cutting apparatus and each of the second and fifth knife assemblies comprises a plurality of knife blades orientated in a generally parallel direction to the feed direction of the cheese cutting apparatus.

5. A method of producing irregular shaped cheese crumbles in accordance with claim 1, including the steps of:
   feeding the slice in the feed direction to the second knife assembly in a generally planar orientation;
   feeding the strips in the feed direction to the third knife assembly in a generally planar orientation; and
   feeding the generally rectangular cheese portions in the feed direction to the fourth knife assembly in a generally non-planar orientation.

6. A method of producing irregular shaped cheese crumbles in accordance with claim 1, including the steps of:
   placing the irregularly shaped cheese crumbles in a tumble drum; and
   adding an anticake agent to the irregularly shaped cheese crumbles in the tumble drum.

7. A method of producing irregular shaped cheese crumbles in accordance with claim 1, including the steps of:
   advancing the cut cheese portions through an auger using a plurality of separate flights on a shaft of the auger; and
   working peripheral edges of the cut cheese portions to reshape the cheese portions using radial edges of the flights, the radial edges of flights being formed between adjacent flights offset a predetermined amount.

8. A method of producing irregular shaped cheese crumbles in accordance with claim 7, wherein the auger comprises a plurality of flights that are offset from each other by ninety degrees.

9. A method of producing irregular shaped cheese crumbles using a cheese cutting apparatus having a feed direction, the method comprising:
   cutting a slice from a bulk cheese product using a first knife assembly;
   cutting a plurality of strips from the slice using a second knife assembly;
   cutting a plurality of generally rectangular cheese portions from the plurality of strips using a third knife assembly;
   cutting a plurality of irregular cheese pieces from the plurality of cheese portions using a fourth knife assembly after the cutting with the first, second and third knives; and
   cutting a plurality of irregular shaped cheese crumbles from the plurality of irregular cheese pieces using a fifth knife assembly;
   wherein at least one of the first, third and fourth knife assemblies comprises at least one knife blade orientated in a generally transverse direction to the feed direction of the cheese cutting apparatus; and at least one of the second and fifth knife assemblies comprises a plurality of knife blades mounted to a shaft for rotation therewith, the spacing between a first pair of adjacent knife blades being different than the spacing between a second pair of adjacent knife blades.

10. A method of producing irregular shaped cheese crumbles using a cheese cutting apparatus having a feed direction, the method comprising:

cutting a slice from a bulk cheese product using a first knife assembly;

cutting a plurality of strips from the slice using a second knife assembly;

cutting a plurality of generally rectangular cheese portions from the plurality of strips using a third knife assembly;

cutting a plurality of irregular cheese pieces from the plurality of cheese portions using a fourth knife assembly after the cutting with the first, second and third knives; and cutting a plurality of irregular shaped cheese crumbles from the plurality of irregular cheese pieces using a fifth knife assembly;

wherein at least one of the first, third and fourth knife assemblies comprises at least one knife blade orientated in a generally transverse direction to the feed direction of the cheese cutting apparatus; and the third knife assembly comprises a plurality of knife blades mounted to a shaft for rotation therewith.

11. A method of producing irregular shaped cheese crumbles using a cheese cutting apparatus having a feed direction, the method comprising:

cutting a slice from a bulk cheese product using a first knife assembly;

cutting a plurality of strips from the slice using a second knife assembly;

cutting a plurality of generally rectangular cheese portions from the plurality of strips using a third knife assembly;

cutting a plurality of irregular cheese pieces from the plurality of cheese portions using a fourth knife assembly after the cutting with the first, second and third knives;

cutting a plurality of irregular shaped cheese crumbles from the plurality of irregular cheese pieces using a fifth knife assembly;

transporting the generally rectangular cheese portions between the third and fourth knife assemblies using an auger having offset flights; and working edges of the generally rectangular cheese portions using edges of the offset flights.

12. A method of producing irregular shaped cheese crumbles using a cheese cutting apparatus having a feed direction, the method comprising:

cutting a slice from a bulk cheese product using a first knife assembly;

cutting a plurality of strips from the slice using a second knife assembly;

cutting a plurality of generally rectangular cheese portions from the plurality of strips using a third knife assembly;

cutting a plurality of irregular cheese pieces from the plurality of cheese portions using a fourth knife assembly after the cutting with the first, second and third knives;

cutting a plurality of irregular shaped cheese crumbles from the plurality of irregular cheese pieces using a fifth knife assembly; and advancing the cheese from at least one of the first knife assembly to the second knife assembly and the fourth knife assembly to the fifth knife assembly using a feed roller and a drum roller.

13. A food product cutting apparatus for use in a high speed commercial manufacturing operation and having a feed direction for producing irregular shaped food crumbles, the apparatus comprising:

a first knife assembly having at least one knife blade positioned generally transverse to the feed direction to cut a slice from a bulk food product;

a second knife assembly having a plurality of knife blades positioned generally parallel to the feed direction to cut a plurality of strips from the slice;

a third knife assembly having at least one knife blade positioned generally perpendicular to the feed direction to cut a plurality of food product portions from the plurality of strips;

a fourth knife assembly having at least one knife blade positioned generally transverse to the feed direction to cut a plurality of irregular food product pieces from the plurality of food product portions; and a fifth knife assembly having a plurality of knife blades positioned generally parallel to the feed direction to cut a plurality of irregular shaped food product crumbles from the plurality of irregular food product pieces.

14. A food product cutting apparatus in accordance with claim 13, wherein the food product comprises one or more cheeses selected from the group consisting of sharp cheddar, medium cheddar, mild cheddar, mozzarella, Monterey jack, Colby, pepper jack, Mexican cheeses, provolone, Swiss, and reduced fat versions thereof.

15. A food product cutting apparatus in accordance with claim 13, wherein at least one of the second and fifth knife assemblies comprises a plurality of knife blades mounted to a shaft for rotation therewith, the spacing between a first pair of adjacent knife blades being different than the spacing between a second pair of adjacent knife blades.

16. A food product cutting apparatus in accordance with claim 15, wherein the third knife assembly comprises a plurality of knife blades mounted to a shaft for rotation therewith.

17. A food product cutting apparatus in accordance with claim 16, wherein an auger is provided to advance the food product in the feed direction, the auger having a plurality of flights, at least two of when are offset having exposed edges effective to work the food product crumbles to reshape the food product.

* * * * *